(12) United States Patent
Sugita

(10) Patent No.: US 6,396,845 B1
(45) Date of Patent: *May 28, 2002

(54) HIERARCHICALLY INTERCONNECTED ROUTERS FOR EXCLUSIVELY POLLING LOW ACTIVITY NETWORK NODES TO REDUCE POLLING TRAFFIC

(75) Inventor: Masahiro Sugita, Tokyo (JP)

(73) Assignee: NEC Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,145

(22) Filed: Apr. 27, 1998

(30) Foreign Application Priority Data

Apr. 25, 1997 (JP) ............................. 9-109326

(51) Int. Cl.$^7$ .............................................. H04L 12/66
(52) U.S. Cl. ...................... 370/449; 370/408; 709/201; 709/224
(58) Field of Search ................................ 370/400, 401, 370/408, 449, 389, 396, 398, 422; 709/201, 223, 224; 340/825.02, 825.08

(56) References Cited

U.S. PATENT DOCUMENTS

| | | | | |
|---|---|---|---|---|
| 5,185,860 A | * | 2/1993 | Wu ............................. | 709/201 |
| 5,204,955 A | * | 4/1993 | Kagei et al. ................. | 709/224 |
| 5,544,314 A | * | 8/1996 | Fuchsreiter et al. ........ | 370/401 |
| 5,651,006 A | * | 7/1997 | Fujino et al. ............... | 370/408 |
| 5,680,116 A | * | 10/1997 | Hashimoto et al. ......... | 370/248 |
| 6,035,331 A | * | 5/2000 | Soga et al. .................. | 709/223 |

FOREIGN PATENT DOCUMENTS

| | | |
|---|---|---|
| JP | 6-37782 | 2/1994 |
| JP | 7-23054 | 1/1995 |

OTHER PUBLICATIONS

Siegl et al, Hierarchical Network Management a Concept and its Prototype in SNMPv2, Computer Network and ISDN Systems, pp. 1–10, 1996.*
Sethi et al, A Hierarchical Management Framework for Battlefield Network Management, IEEE, pp. 1–5, 1997.*
Wood et al, Fremont: A System for Discovering Network Characteristic and Problems, USENIX, pp. 335–348, 1993.*

* cited by examiner

Primary Examiner—Wellington Chin
Assistant Examiner—Frank Duong
(74) Attorney, Agent, or Firm—Ostrolenk, Faber, Gerb & Soffen

(57) ABSTRACT

In a communication network, routers are interconnected in a hierarchical tree structure and local network nodes are connected to each of the routers located at the lowest level of the tree structure. A network monitor is connected to one of the routers which is located at the top of the tree structure. Each router comprises a first memory having a plurality of entries and a second memory. In response to a packet from the network, a physical address and a corresponding logical address are mapped in one of the entries and a predetermined timer value is set. The timer value is decremented at regular intervals. At regular intervals, the first memory is searched for an entry whose timer value is decremented to a predefined threshold and one of the local network nodes corresponding to this entry is polled to receive a response therefrom indicating an operating state of the polled node. The response is stored in the second memory. The network monitor transmits a polling signal to each router at the lowest level and receives the contents of the second memory.

12 Claims, 2 Drawing Sheets

FIG. 2

| MAC ADDRESS ⸝26a | IP ADDRESS ⸝26b | TIMER VALUE ⸝26c | POLLING INDICATION ⸝26d |
|---|---|---|---|
| 00:00:4c:12:34:56 | 125. 12. 10. 1 | 20 | 0 |
| 00:00:4c:12:34:56 | 125. 12. 34. 255 | 30 | 0 |
| 00:00:4c:12:34:78 | 125. 12. 56. 23 | 0 | 1 |
| 00:00:4c:12:34:89 | 125. 12. 56. 108 | 30 | 1 |
| 00:00:4c:12:34:9A | 125. 12. 78. 26 | 10 | 1 |

HIERARCHICALLY INTERCONNECTED ROUTERS FOR EXCLUSIVELY POLLING LOW ACTIVITY NETWORK NODES TO REDUCE POLLING TRAFFIC

BACKGROUND OF THE INVENTION

1. Field of the Invention

The present invention relates to a monitor system for a hierarchical network in which routers are organized in a tree structure and local network nodes are polled at intervals from the routers.

2. Description of the Related Art

In a network monitor system as disclosed in Japanese Laid-Open Patent Specification Hei-7-23054, a network monitor is connected to a number of data transmission units via a line connection unit in which a number of polling circuits are associated with the data transmission units to perform polling operations under control of the network monitor to collect data from the polled units. The data collected in this manner are stored in a memory of the line connection unit and the network monitor reads the contents of the memory at regular intervals. While this polling technique is useful for reducing the amount of task performed by the network monitor, the polling traffic accounts for a substantial proportion of the overall network traffic if the polling rate is increased.

According to another prior art network monitor system as disclosed in Japanese Laid-Open Patent Specification Hei-6-37782, repeater stations are connected in a hierarchical tree structure with the top of the structure being connected to a network monitor. The network monitor uses data representing the structural organization of the network to poll the repeater stations, starting with the stations at the lowest level of the hierarchy. If the polling to a station at the lowest level is successful, the network monitor cancel its polling to a station immediately higher than the lowest-level station. However, the cancellation of polling to intermediate-level stations would have no effect on reducing the total traffic if many lowest-level stations were attached to the intermediate-level stations.

SUMMARY OF THE INVENTION

It is therefore an object of the present invention to provide a network monitor system in which the polling traffic is reduced by polling silent network nodes.

According to a first aspect, the present invention provides a communication network comprising a plurality of routers interconnected in a hierarchical tree structure, a plurality of local network nodes connected to each of the routers located at lowest level of the tree structure, and a network monitor connected to one of the routers which is located at top of the tree structures. Each of the routers comprises polling means for detecting a low activity local network node having no access from the network for a period longer than a predetermined length and polling the local network node to receive a response therefrom indicating an operating state of the polled node, and a memory for storing the response. The network monitor transmits a polling signal to each router at the lowest level and receiving contents of the memory. Since the polling from each router to its own local network nodes is performed only to those nodes which remain silent for a predetermined period or longer, the polling traffic of the network is significantly reduced.

According to a second aspect, the present invention provides a communication network comprising a plurality of routers interconnected in a hierarchical tree structure, a plurality of local network nodes connected to each of the routers located at lowest level of the tree structure, and a network monitor connected to one of the routers which is located at top of the tree structure. Each of the routers comprises a first, or cache memory having a plurality of entries, address resolution means for mapping a physical address to a corresponding logical address in one of the entries and setting a predetermined timer value in the one entry in response to a packet from the network, and varying the timer value a predetermined amount at regular intervals, polling means for making a search through the first memory at regular intervals to detect an entry whose timer value is varied to a predefined threshold and polling one of the local network nodes corresponding to this entry to receive a response therefrom indicating an operating state of the polled node, and a second memory for storing the response. The network monitor transmits a polling signal to each router at the lowest level of the tree structure and receives the contents of the second memory.

BRIEF DESCRIPTION OF THE DRAWINGS

The present invention will be described in further detail with reference to the accompanying drawings, in which:

FIG. 2 is an illustration of the contents of a cache table used in each router of the network.

DETAILED DESCRIPTION

Figure 1:
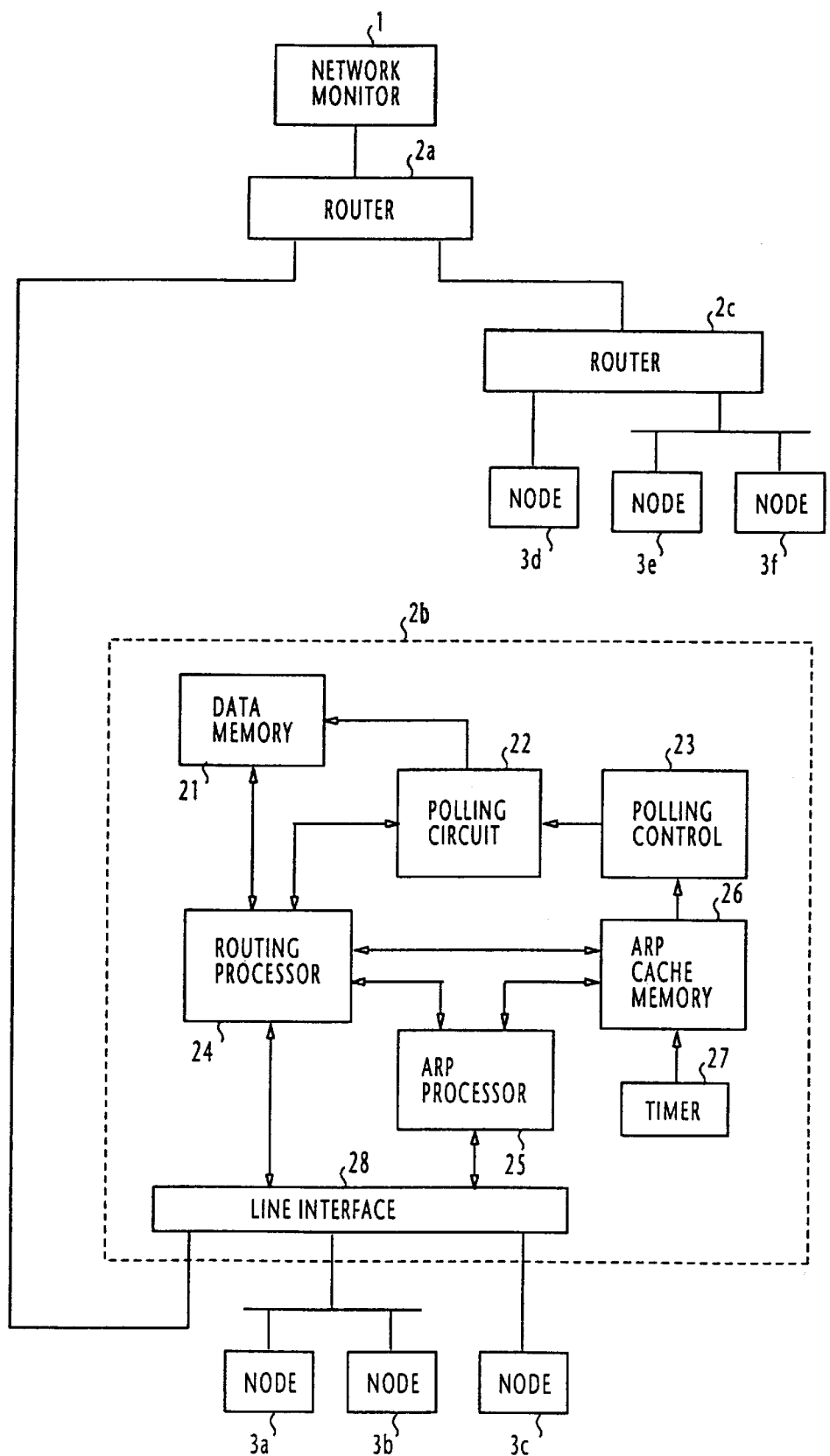
FIG. 1 is a block diagram of a communication network according to the present invention.

In FIG. 1, a communication network according to the present invention comprises a network monitor 1, a plurality of routers 2a, 2b, 2c interconnected in a hierarchical tree structure for establishing a connection between the network monitor 1 and a plurality of network nodes 3a to 3f. In the illustrated embodiment, the router 2a is at the top of the tree structure and the network monitor 1 is connected to this router, and the routers 2b and 2c are attached to the router 2a so that connection between the routers 2b and 2c is established via the router 2a.

In each router, a routing processor 24 is provided for receiving a polling packet from the network monitor 1 via a line interface 28 and returns a response via the interface 28, containing the contents of the data memory 21 to the network monitor 1. If a packet is received in response to the transmission of a polling signal from its own router, this packet is applied to the polling processor 22.

ARP cache memory 26 of router 2b, for example, is shown in FIG. 2. Cache memory 26 is partitioned into a plurality of entries corresponding to remote routers 2a, 2c and local nodes 3a, 3b and 3c. Each entry is subdivided into a plurality of fields 26a to 26d for mapping a physical address such as MAC (medium access control sublayer) address, a logical addresses such as IP (internet protocol) address, a timer value and a polling indication bit, respectively. Although the mapping relation between the MAC and IP addresses are usually unchanged as long as the corresponding node remains connected to the same router. If the IP address of a given network node has changed for some reason, the mapping relation of the given node in the cache memory is changed accordingly.

In FIG. 2, the first entry of the cache memory 26 is associated with the router 2a, for example. Router 2a is represented in the MAC address field 26a by 6-byte MAC address (00:00:4C:12:34:56) and in the IP field by 4-byte address (125.12.10.1). A timer value of 20 seconds will be given if the initial value 30 seconds and 10 seconds has lapsed from the time the entry is created or accessed. The second entry of the cache memory 26 indicates that the access from router 2b to router 2c via router 2a involves the use of the MAC address of router 2a and the IP address (125.12.34.255) of router 2c. If this entry has just been created or accessed, the time, field 26c will be set with the initial value of 30 seconds. In the polling indication fields 26d of the first and second entries are both set with binary 0, indicating that the routers are not to be polled.

If a packet is from the network, the routing processor 24 makes a search through an ARP (address resolution protocol) cache memory 26 for the destination MAC address that corresponds to the IP address contained in the received packet.

If the routing processor 24 is successful in the search through the ARP cache memory 26, it reads the MAC address from the corresponding entry and formulates a packet and transmits it to the network.

If the routing processor 24 is not successful in the search, it commands an ARP processor 25 to initiate an address resolution process. The ARP processor 25 formulates and forwards an ARP request packet to the network via the line interface 28 and receives a response containing the desired destination MAC and IP addresses from the network. The ARP processor 25 creates a new entry in the cache memory 26, stores the received MAC and IP addresses in the address fields 26a and 26b, and sets the initial timer value into the timer field 26c and a binary "1" into the polling indication field 26d indicating that this entry is associated with a node and polling is to be performed. A timer 27 is connected to the cache memory 26. At regular intervals, the timer 27 simultaneously decrements all the timer values of the cache memory and discards an entry if its timer value has reduced to zero.

Each router further includes a polling controller 23 which operates independently from the network monitor 1 as an autonomous polling station. At regular intervals, the polling controller 23 reads the timer value of each entry and compares it with a predefined low threshold. If a network node has no access from the network so that its activity is low, the timer value of its corresponding entry in the cache memory reduces below the predefined low threshold. When this occurs, the polling controller 23 commands the polling circuit 22 to send a polling packet to the low activity node to cause it to return a response containing information about its operating state. When a response from the polled node arrives, the polling circuit 22 makes an error check and stores the status information of the response into the data memory 21 if no error exists. If an error is detected, the polling circuit 22 retransmits the polling packet to the low activity node.

At intervals, the network monitor 1 sends a polling packet to the network. This packet is received by the routing processor 24 of each router. If the routing processor 24 determines that the polling packet contains the address of its own router, it reads status data from the data memory 21 and forwards it to the network monitor 1.

Since the polling from each router to its own local network nodes is performed only to those nodes whose entries in the ARP cache memory 26 are deleted, the polling traffic of the network is significantly reduced.

What is claimed is:

1. A communication network comprising:
   a plurality of routers interconnected in a hierarchical tree structure;
   a plurality of local network nodes connected to said routers located at a lowest level of the tree structure; and
   a network monitor connected to one of said routers which is located at a top of said tree structure,
   each of said routers comprising;
      polling means for detecting a local network node having no access from the network for a period longer than a predetermined length and polling the local network node to receive a response therefrom indicating an operating state of the polled node; and
      a memory for storing said response,
   said network monitor transmitting a polling signal to each router at the lowest level and receiving the contents of said memory.

2. A communication network comprising:
   a plurality of routers interconnected in a hierarchical tree structure;
   a plurality of local network nodes connected to said routers located at a lowest level of the tree structure; and
   a network monitor connected to one of said routers which is located at a top of said tree structure,
   each of said routers comprising:
      a first memory having a plurality of entries;
      address resolution means for mapping a physical address to a corresponding logical address in one of said entries, setting a predetermined timer value in said one entry in response to a packet from the network, and varying the timer value by a predetermined amount at regular intervals;
      polling means for making a search through said first memory at regular intervals to detect an entry whose timer value has crossed a threshold and polling one of said local network nodes corresponding to the entry to receive a response therefrom indicating an operating state of the polled node; and
      a second memory for storing said response;
   said network monitor transmitting a polling signal to each router at the lowest level and receiving the contents of said second memory.

3. A method for polling a communication network, wherein the network comprises a plurality of routers interconnected in a hierarchical tree structure, a plurality of local network nodes connected to said routers located at lowest level of the tree structure, and a network monitor connected to one of said routers which is located at a top of said tree structure, wherein each of said routers comprises a memory, said method comprising:
   detecting a local network node having no access from the network for a period longer than a predetermined length;
   detecting a local network node to receive a response therefrom indicating an operating state of the polled node;
   storing said response in said memory; and
   transmitting a polling signal from the network monitor to each router at the lowest level and receiving the contents of said memory.

4. A polling method for a communication network, wherein the network comprises a plurality of routers interconnected in a hierarchical tree structure, a plurality of local network nodes connected to the routers located at lowest level of the tree structure, and a network monitor connected to one of said routers which is located at a top of said tree structure, wherein each of said routers includes a first memory having a plurality of entries and a second memory, the method comprising:

mapping a physical address to a corresponding logical address in one of said entries;

setting a predetermined timer value in said one entry in response to a packet from the network;

varying, at regular intervals, the timer value of each entry of said first memory by a predetermined amount;

making a search through said first memory at regular intervals to detect any entry whose timer value has crossed a threshold;

polling one of said local network nodes which corresponds to the entry to receive a response therefrom indicating an operating state of the polled network node;

storing said response in said second memory; and transmitting a polling signal from the network monitor at periodic intervals to each router at the lowest level and receiving the contents of said second memory.

5. A communication network comprising:

a plurality of interconnected routers;

at least one local network node connected to said routers;

a network monitor connected to at least one of said routers;

each of said routers comprising:
  a polling control circuit which detects a particular network node, said particular network node having no access from said network for a period longer than a threshold, said polling control circuit further polls said particular network node to receive a response therefrom indicating an operating state of said particular network node; and
  a memory which stores said response; wherein said network monitor transmits a polling signal to each router and receives the contents of said memory.

6. The communication network as recited in claim 5, wherein:

said routers are connected in a hierarchical tree structure having a top and a bottom;

said network monitor is connected to a router at said top of said tree structure; and said network nodes are connected to said bottom of said hierarchical tree structure.

7. A communication network comprising:

a plurality of interconnected routers;

at least one local network node connected to said routers;

a network monitor connected to at least one of said routers;

each of said routers comprising:
  a first memory;
  an address resolution processor, wherein said address resolution processor receives a packet including a logical address, said address resolution process maps a physical address to said logical address and sets a timer value in response thereto, said address resolution processor stores said timer value in said first memory and varies all said timer values at regular intervals;
  a polling control circuit which performs a search through said first memory at regular intervals and detects a particular entry whose timer value has crossed a threshold, said polling control circuit polls a particular node of said local network nodes corresponding to said particular entry and receives a response therefrom indicating an operating state of said particular node; and
  a second memory which stores said response; wherein said network monitor transmits a polling signal to each router and receives the contents of said second memory.

8. The communication network as recited in claim 7, wherein:

said routers are connected in a hierarchical tree structure having a top and a bottom;

said network monitor is connected to a router at said top of said tree structure; and said network nodes are connected at said bottom of said hierarchical tree structure.

9. A method for polling a communication network, wherein the network comprises a plurality of interconnected routers, at least one local network node connected to said routers, a network monitor connected to at least one of said routers, and wherein each of said routers includes a memory, said method comprising:

detecting a particular local network node having no access from said network for a period longer than a threshold;

polling said particular local network node and receiving a response therefrom indicating an operating state of said particular local network node;

storing said response in said memory;

transmitting a polling signal from said network monitor to each router; and receiving the contents of said memory by said network monitor.

10. The method as recited in claim 9, wherein:

said routers are connected in a hierarchical tree structure having a top and a bottom;

said network monitor is connected to a router at said top of said tree structure; and said network nodes are connected at said bottom of said hierarchical tree structure.

11. A method for polling a communication network, wherein the network comprises a plurality of interconnected routers, at least one local network node connected to said routers, a network monitor connected to at least one of said routers, and wherein each of said routers includes a first and a second memory, the method comprising:

receiving a packet including a logical address;

mapping a physical address to said logical address and setting a timer value in response thereto;

storing said timer value in said first memory;

varying, at regular intervals, all timer values in said first memory;

searching said first memory for a particular entry whose timer value has crossed a threshold;

polling a particular node of said local network nodes which corresponds to said particular entry and receiving a response therefrom indicating an operating state of said particular node;

storing said response in said second memory; and transmitting a polling signal from said network monitor to each router and receiving the contents of said second memory.

12. The method as recited in claim 11, wherein:

said routers are connected in a hierarchical tree structure having a top and a bottom;

said network monitor is connected to a router at said top of said tree structure; and said network nodes are connected at said bottom of said hierarchical tree structure.

* * * * *